United States Patent
Kurpejovic et al.

(10) Patent No.: US 11,486,285 B2
(45) Date of Patent: Nov. 1, 2022

(54) EXHAUST GAS HEATER

(71) Applicant: Purem GmbH, Neunkirchen (DE)

(72) Inventors: Enver Kurpejovic, Kirchheim unter Teck (DE); Vijaya Bhaskar Solipuram, Esslingen (DE); Fatih Uysal, Plochingen (DE)

(73) Assignee: PUREM GMBH, Neunkirchen (DE)

( * ) Notice: Subject to any disclaimer, the term of this patent is extended or adjusted under 35 U.S.C. 154(b) by 0 days.

(21) Appl. No.: 16/951,816

(22) Filed: Nov. 18, 2020

(65) Prior Publication Data

US 2021/0156289 A1 May 27, 2021

(30) Foreign Application Priority Data

Nov. 22, 2019 (DE) ..................... 10 2019 131 556.5

(51) Int. Cl.
*F01N 3/20* (2006.01)

(52) U.S. Cl.
CPC ........ *F01N 3/2013* (2013.01); *F01N 2240/16* (2013.01)

(58) Field of Classification Search
CPC ... F01N 2240/16; F01N 3/2013; F01N 3/2892
See application file for complete search history.

(56) References Cited

U.S. PATENT DOCUMENTS

| | | | |
|---|---|---|---|
| 6,106,282 A | 8/2000 | Humburg et al. | |
| 9,375,682 B2 * | 6/2016 | Maus | F01N 3/208 |
| 10,801,388 B2 * | 10/2020 | Culbertson | F01N 13/008 |
| 2005/0063689 A1 * | 3/2005 | Auber | F02M 31/125 |
| | | | 392/468 |
| 2014/0080075 A1 | 3/2014 | Young et al. | |
| 2015/0267596 A1 * | 9/2015 | Tobben | F01N 13/08 |
| | | | 60/274 |
| 2019/0112962 A1 * | 4/2019 | Gaiser | F01N 13/141 |

FOREIGN PATENT DOCUMENTS

| | | |
|---|---|---|
| CN | 107685610 A | 2/2018 |
| CN | 109973182 A | 7/2019 |
| DE | 10143459 A1 | 4/2003 |

(Continued)

OTHER PUBLICATIONS

English Translation of CN 109973182A (Year: 2019).*

*Primary Examiner* — Anthony Ayala Delgado
(74) *Attorney, Agent, or Firm* — McGlew and Tuttle, P.C.

(57) ABSTRACT

An exhaust gas heater, for an internal combustion engine exhaust system, includes a support (22) with an outer circumferential area (24), arranged radially outside in relation to a heater longitudinal axis (A), and a central area (26). A heating conductor (42) is carried at the support and includes a helically wound heating section (44) on a first axial side (34) of the support. The central area is axially offset in a direction of the first axial side of the support in relation to the outer circumferential area such that a radially outer end section of the heating section, which outer end section is located in the area of the outer circumferential area of the support, and a radially inner end section (48) of the heating section, which inner end section is located in the area of the central area of the support, are axially offset in relation to one another.

22 Claims, 6 Drawing Sheets

(56) References Cited

FOREIGN PATENT DOCUMENTS

| | | |
|---|---|---|
| DE | 102005011657 A1 | 9/2006 |
| DE | 102011052324 A1 | 2/2013 |
| DE | 102016104142 A1 | 9/2017 |
| EP | 2935996 B1 | 3/2019 |
| WO | 2014100118 A1 | 6/2014 |

\* cited by examiner

EXHAUST GAS HEATER

CROSS REFERENCE TO RELATED APPLICATIONS

This application claims the benefit of priority under 35 U.S.C. § 119 of German Application 10 2019 131 556.5, filed Nov. 22, 2019, the entire contents of which are incorporated herein by reference.

TECHNICAL FIELD

The present invention pertains to an exhaust gas heater for an exhaust system of an internal combustion engine, which can be used especially to heat exhaust gas flowing towards a catalytic converter unit.

TECHNICAL BACKGROUND

An exhaust gas heater, in which a support fixed to a tubular exhaust gas-carrying component is formed such that a helically wound heating conductor carried on this support is arranged in a plane oriented essentially at right angles to an exhaust gas flow direction, is known from EP 2 935 996 B1.

SUMMARY

An object of the present invention is to configure an exhaust gas heater such that it has an improved heating performance along with high strength.

This object is accomplished according to the present invention by an exhaust gas heater for an exhaust system of an internal combustion engine, comprising: a support with an outer circumferential area arranged radially outwards in relation to a heater longitudinal axis and with a central area; and a heating conductor carried at the support, wherein the heating conductor comprises a helically wound heating section arranged at a first axial side of the support.

This exhaust gas heater is characterized in that the central area is arranged axially offset in relation to the outer circumferential area in the direction of the first axial side of the support such that a radially outer end section of the heating section, which radially outer end section is located in the area of the outer circumferential area of the support, and a radially inner end section of the heating section, which radially inner end section is located in the area of the central area of the support, are arranged axially offset in relation to one another.

In the exhaust gas heater configured according to the present invention, both the support and the heating section of the heating conductor, which heating section is carried at the support, have a structure extending axially from the radially outward direction to the radially inward direction in their extension. Due to this axially extended winding structure of the heating conductor, a greater length of extension and hence a stronger thermal interaction of the heating conductor with the exhaust gas flowing around it are achieved at equal number of turns compared to the structure known from the state of the art, in which the heating section of the heating conductor is located essentially in one plane. The axially extended structure of the support makes this support more rigid especially in the axial direction compared to a support located essentially in one plane and thus it leads to an increased natural frequency of the support. The risk that a fatigue of the support that would possibly lead to damage due to excitation-based vibrations inevitably occurring in an exhaust system over the service life can thus be markedly diminished.

To provide this axially extended structure, the support may comprise a carrying area with an essentially conical shape, which carrying area extends between the outer circumferential area and the central area and carries essentially the heating section. It should be noted that such a conical shape or funnel shape may be provided in the sense of the present invention, for example and preferably, by the carrying area having an essentially uncurved course in its extension from the radially outward direction to the radially inward direction. Such a shape may, however, also be achieved with a course of the carrying area that is curved, for example, in the form of a parabola or of a hyperbola.

To reduce the flow losses introduced by the support, the central area may be arched out convexly in the direction of the first axial side.

In order to make the exhaust gas heater resistant to corrosive components of the exhaust gas flowing through same and to a high thermal load, it is proposed that the support be configured as a metal component, preferably as a shaped sheet metal part.

In order to avoid an electrical short-circuit in the area of the exhaust gas heater, the heating conductor may be electrically insulated in its length area covering the support.

In an alternative embodiment, which may form an independent aspect of the present invention regardless of the shape of the support and which leads to a further improvement of the thermal interaction of the heating conductor with the exhaust gas flowing around same, the heating conductor may be essentially free from electrical insulation in its length area covering the support, and a plurality of insulating elements that enclose the heating conductor and are fixed at the support and/or are supported at the support may be provided at the heating conductor. Thus, the heating conductor is insulated by the provision of the insulating elements and is thus also shielded against a direct contact with the exhaust gas stream only in areas in which a contact with the heating conductor cannot be avoided for generating a holding effect or supporting effect. Such a configuration of the heating conductor may be used both in the case of the axially extended, for example, conical configuration of the support, in which case outer and inner end sections of the heating section, which end sections are axially offset in relation to one another, are used, and also in case of a support that has a flat, essentially uncurved central area, for example, essentially at right angles to the heater longitudinal axis, so that the radially outer and inner end sections of the heating section are also not offset essentially axially in relation to one another.

In order to provide a connection between the outer circumferential area and the central area while the possibility of flow through the support is ensured, it is proposed that the support comprise a plurality of connection webs, which are arranged at circumferentially spaced locations from one another and connect the central area to the outer circumferential area, wherein passage flow openings are formed between connection webs that are directly adjacent to one another in the circumferential direction.

The flow openings following each other in the circumferential direction can provide a plurality of opening ring structures arranged in a radially staggered manner. Based on the helical structure, such a ring structure of the heating section leads to such a ring structure of the flow openings that areas of the flow openings exist in which these are covered by the heating section and there are areas of the flow openings in which these are not covered by the heating section. A balanced structure can thus be obtained in terms of the lowest possible flow resistance, on the one hand, and of the lowest possible amount of heat introduced into the support, on the other hand.

In an alternative type of embodiment, it is proposed that flow openings following one another in the circumferential direction provide a helical opening structure.

A helical course of the helical opening structure may correspond here essentially to a helical course of the heating section, and the heating section may be arranged in terms of the helical opening structure such that the heating section of the flow openings is arranged essentially such that it covers the flow openings of the helical opening structure. It is consequently ensured in this configuration that the lowest possible thermal interaction will take place between the heating section and the support, so that heat losses over the support can be minimized.

It is proposed in an alternative type of configuration that a helical course of the helical opening structure correspond essentially to a helical course of the heating section, and that the heating section be arranged in relation to the helical opening structure such that the heating section is arranged such that it does not essentially cover the flow openings of the helical opening structure. A good possibility of flow through the flow openings is given preference in this configuration, so that the flow resistance introduced by the exhaust gas heater can be minimized.

It is proposed for connecting the heating conductor with its two connection areas to a voltage source that the heating conductor comprise a connection section adjoining the radially inner end section of the heating section, wherein the connection section is led at a second axial side of the support from the radially inward direction in the radially outward direction along a connection web. By guiding the connection section along the connection web, an impairment of the possibility of flow through the exhaust gas heater, which impairment is introduced by the connection section, is avoided.

Stable holding of the heating conductor at the support can be ensured now by first groups of insulating elements arranged such that they extend from the radially outward direction in the radially inward direction in the area of the connection webs being arranged in the area of the connection webs at the heating conductor, the insulating elements of the first groups of insulating elements enclosing sections of the heating section extending in the area of the connection webs.

An even more improved holding effect or supporting effect is achieved when at least one second group of insulating elements, which is arranged extending from the radially outward direction to the radially inward direction, is provided between at least two first groups of insulating elements following one another directly in the circumferential direction, the insulating elements of the second group of insulating elements enclosing sections of the heating section extending in the area between two connection webs.

To fix the heating conductor at the support, the heating section may be held at the support by a plurality of preferably comb-like (comb-shape) holding elements that extend over this heating section and are fixed at the support.

It is advantageous especially in the case of an essentially not electrically insulated configuration of the heating conductor if the heating section is held by means of a holding element at the support in the area of at least one and preferably each first group of insulating elements.

A plurality of fastening sections bent off in the axial direction may be provided at the outer circumferential area of the support for fixing the support at an exhaust gas-carrying component.

A configuration saving axial installation space can be guaranteed by at least a part and preferably all fastening sections being bent off in the direction of the first axial side.

The present invention further pertains to an exhaust system, comprising a preferably tubular exhaust gas-carrying component and an exhaust gas heater, which is arranged in the exhaust gas-carrying component and is configured according to the present invention.

The exhaust gas heater may be arranged in the exhaust gas-carrying component, extending essentially in the direction of an exhaust gas main flow direction, for example, such that the support is oriented with its first axial side in the upstream direction such that the radially inner end section of the heating section, which inner end section is located in the area of the central area of the support, is positioned upstream in relation to the radially outer end section of the heating section, which said outer end section is located in the area of the outer circumferential area of the carrier, or/and that the heating section is not covered by the support on its side oriented in the upstream direction.

In order to make it possible to utilize the heat introduced into the exhaust gas by the heating conductor, it is proposed that the exhaust gas heater be arranged upstream in relation to an exhaust gas treatment unit, preferably a catalytic converter unit, which is arranged in the exhaust gas-carrying component.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
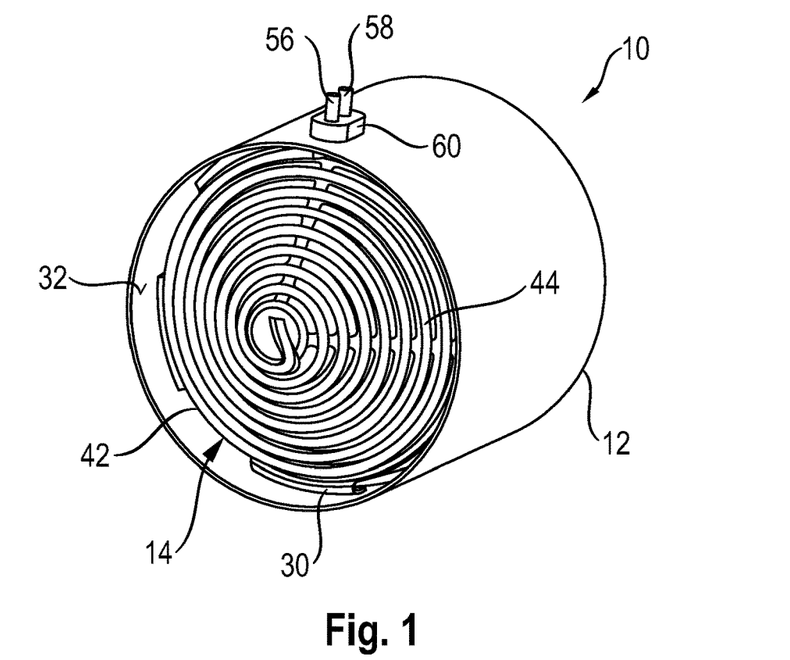
FIG. 1 is a perspective view of a part of the exhaust system for an internal combustion engine having an exhaust gas heater.
Figure 2:
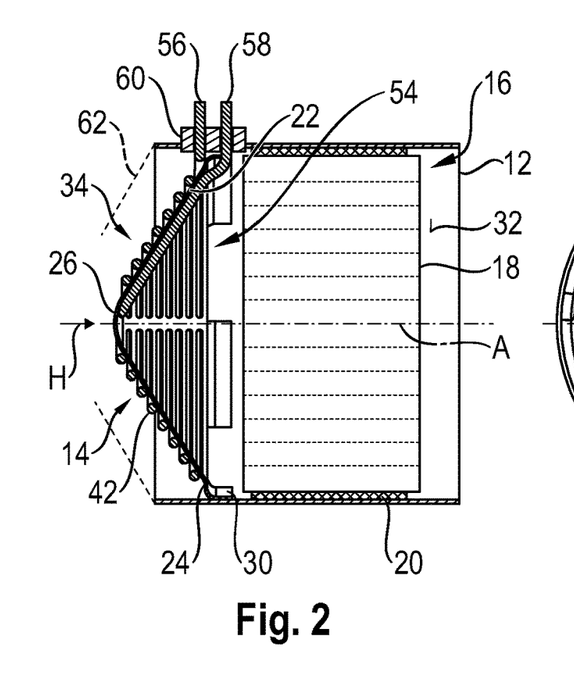
FIG. 2 is a longitudinal sectional view of the part of an exhaust system, which part is shown in FIG. 1, cut along a line II-II in FIG. 3.
Figure 3:
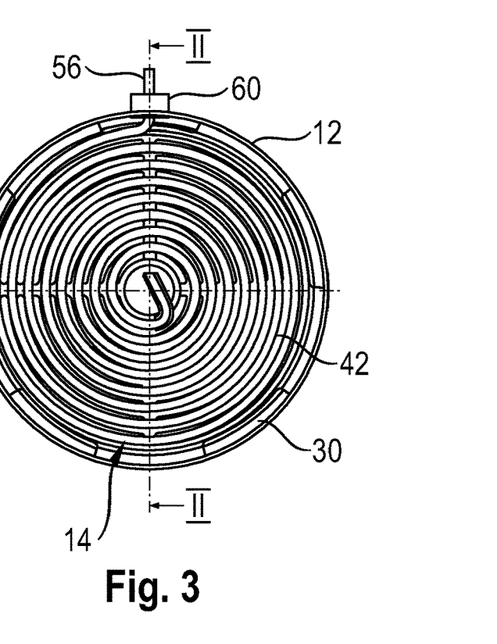
FIG. 3 is an axial sectional view of the part of an axial contact, which is shown in FIG. 1.

Referring to the drawings, FIGS. 1 through 3 show a section of an exhaust system of an internal combustion engine especially in a vehicle, which said exhaust system is generally designated by 10. The exhaust system 10 comprises an exhaust gas-carrying component 12, which is configured, for example, as an exhaust gas pipe and in which an exhaust gas heater 14 and, in an exhaust gas main flow direction H downstream in relation to the exhaust gas heater 14, a catalytic converter unit 16 representing an example of an exhaust gas treatment unit are arranged in the length area shown. The catalytic converter unit 16 may comprise a catalytic converter block 18 coated with a catalytically active material, which is held in a stable manner in the exhaust gas-carrying component 12, for example, by a fiber mat 20 or the like.

Figure 5:
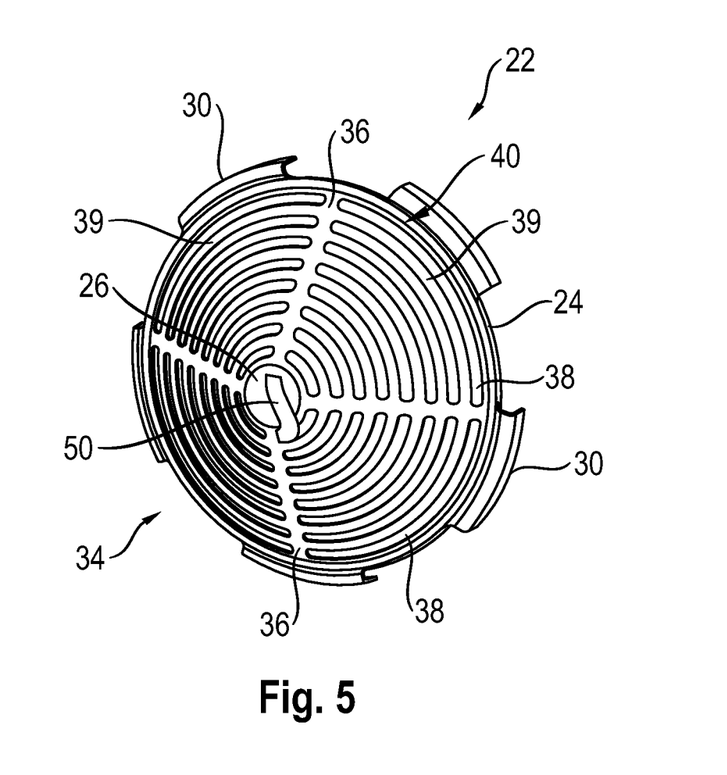
FIG. 5 is a perspective view showing a support of the exhaust gas heater shown in FIGS. 1 through 3.

The exhaust gas heater 14 comprises a support 22, which is shown in FIG. 5 and is configured, for example, as a shaped sheet metal part. The support 22 has an outer circumferential area 24 located radially on the outside in relation to a heater longitudinal axis A and a central area 26 located centered in relation to the heater longitudinal axis A. A carrying area of the support 22, generally designated by 28, extends between the outer circumferential area 24 and the central area 26. This carrying area 28 has an essentially conical or cone-shape or funnel-shape, so that the outer circumferential area 24 and the central area 26 are located axially offset in the direction of the heater longitudinal axis A. The conical shape of the carrying area 28 may be provided, as this is illustrated in FIG. 2, with an essentially straight and uncurved extension of the carrying area 28 between the outer circumferential area 24 and the central area 26. This conical structure of the carrying area 28 may, however, also be provided in the sense of the present invention with a curved course of the carrying area 28, for example, with a course that is curved convexly in at least some areas or is curved concavely in at least some areas in relation to the exhaust gas main flow direction H.

In the radially outward direction of the support 22, the support has, starting from the outer circumferential area 24, a plurality of fastening sections 30. These fastening sections 30 are bent off axially and are in contact with an inner circumferential surface 32 of the exhaust gas-carrying component 12 and are fixed thereon, for example, by welding or soldering. In the exemplary embodiment shown in FIGS. 1 through 5, the fastening sections 30 are bent axially in the direction away from a first axial side 34 of the support 22 or of the carrying area 28 thereof. It can be seen in FIG. 2 that this first axial side 34 of the support 22 is arranged such that it is oriented in the upstream direction, i.e., facing the exhaust gas stream flowing towards the exhaust gas heater.

FIG. 5 shows, further, that a total of four connection webs 36 connect in the shown exemplary embodiment of the support 22 the outer circumferential area 24, which has, for example, a ring-shaped configuration, with the central area 26, which is arched preferably convexly in the direction of the first axial side 34 of the support 22, i.e., in the upstream direction. Each of the four connection webs 36 may extend approximately straight from the radially outward direction to the radially inward direction.

A plurality of flow openings 38 separated by circumferential webs 39 extending approximately in the circumferential direction between two connection webs are formed in a radially staggered manner in the circumferential direction between two respective connection webs 36 located each directly adjacent to one another. In the exemplary embodiment shown, the flow openings 38 are formed in the manner of ring segments, and flow openings 38 following one another in the circumferential direction form a respective opening ring structure 40 each. It is seen in FIG. 4 that a plurality of such opening ring structures 40 are provided in a radially staggered manner and preferably concentrically in relation to the heater longitudinal axis A.

Figure 4:
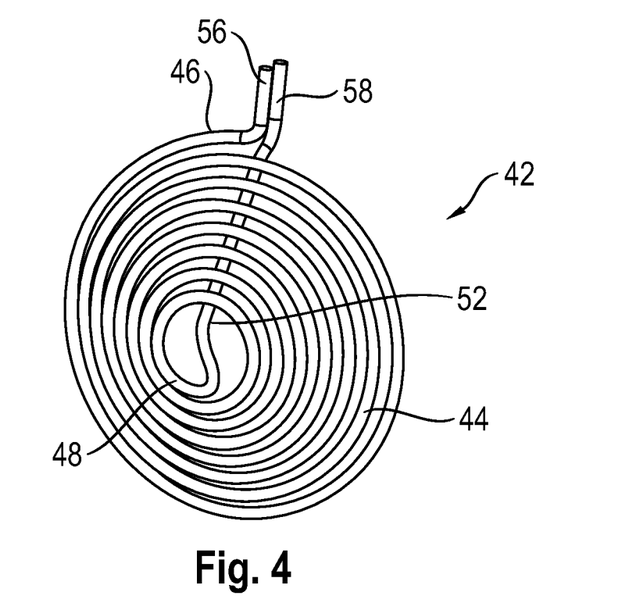
FIG. 4 is a perspective view showing the heating conductor of the exhaust gas heater shown in FIGS. 1 through 3.

The exhaust gas heater 14 further comprises a heating conductor 42 shown in detail in FIG. 4. The heating conductor 42 has a heating section 44 arranged on the first axial side 34 of the support 22 or of the carrying area 28 thereof. Starting from a radially outer end section 46 positioned in the area of the outer circumferential area 24 of the support 22, the heating conductor 42 extends in this heating section 44 to a radially inner end section 48 with helically wound structure, which end section 48 is located radially on the inside in the area of the central area 26. Adapted to the axially extended structure of the support 22, the heating section 44 is also extended axially, so that the radially outer end section 46 and the radially inner end section 48 are located axially offset in relation to one another and the heating section 44 thus has a conical structure of its turns adapted to the conical structure of the carrying area 28.

The heating conductor 42 is in contact with its heating section 44 with the first axial side 34 of the support 22 in the area of the carrying area 28 and is fixed thereto in the manner described below. An opening 50, which is intended for the passage of the heating conductor 42 and through which the heating conductor 42 is led in an area in which the heating section 44 passes over into a connection section 52 in the area of the radially inner end section 48, is formed in the area of the central area 26 of the support 22. The connection section 52 extends from the radially inner end section 48 along one of the connection webs 36 on a second axial side 54 of the support 22 radially outwards, so that a first connection section 56 adjoining the radially outer end section 46 and a second connection section 58 adjoining the connection section 52 are positioned radially on the outside in relation to the heating section 44 and are led through the exhaust gas-carrying component 12 in the area of an insulating element 64.

Based on the helical course of the heating section 44 and on the configuration of the flow openings 38, which provide the radially staggered opening ring structures 40, a course of the heating section in relation to these opening ring structures 40, which course can be seen in the axial view in FIG. 3, is obtained. There exist areas in which, when viewed in the direction of the heater longitudinal axis A as well as when viewed in the direction at right angles to a surface of the carrying area 28, which surface is located on the first axial side 34, the heating section 44 covers the flow openings 38, i.e., it is not in contact with the carrying area 28, and areas in which the heating section 44 does not cover the flow openings 38, but is in contact with the carrying area 28 of the support 22. Thus, the flow resistance does not increase excessively for the exhaust gas flowing in the exhaust gas main flow direction H towards the exhaust gas heater 14, on the one hand, and, on the other hand, an excessively intense contact between the heating conductor 42 and the support 22 and hence an excessive introduction of heat into the support 22 is avoided. Since the connection section 52 extends along one of the connection webs 36 radially outwards, this does not substantially compromise the possibility of flow through the exhaust gas heater.

In order to avoid the development of an electrical short-circuit in the areas in which the heating conductor 42 is in direct contact with the support 22, which is preferably provided as a shaped sheet metal part, the heating conductor 42 is electrically insulated essentially in its entire length area between the two connection sections 56, 58 in the exemplary embodiment shown in FIGS. 1 through 5.

Due to the axially extended, conical or cone-shape of the exhaust gas heater 14, a relatively great length of extension of the heating conductor 42 is made possible in the exhaust gas stream with a compact configuration, so that this heating conductor 42 can provide a higher heat output, and an efficient heating of the exhaust gas stream flowing towards the catalytic converter unit 16 is reached. This ensures that rapid heating of the catalytically active material is reached even during such phases of operation as, e.g., a cold start, so that the time elapsing while the catalytic converter unit cannot be catalytically active based on an excessively low temperature is reduced. At the same time, the axially extended, conical structure of the support 22 provides a configuration in which the exhaust gas heater 14 has a higher rigidity especially in the direction of the heater longitudinal axis A. The vibrations, which develop during the operation of an internal combustion engine and are inevitably transmitted to the exhaust system 10, cannot consequently lead substantially to excitation-based vibrations, which could lead to fatigue and to damage to the support 22 over the lifetime based on the increased natural frequency of the support 22. The axially extended structure of the exhaust gas heater 14, which tapers from the radially outward direction to the radially inward direction in the upstream direction, makes it, furthermore, possible to position the exhaust gas heater 14 in the exhaust gas-carrying component 12 such that the exhaust gas heater 14 projects in some areas from the exhaust gas-carrying component 12 in the upstream direction and meshes with an interior space, which is provided by an additional exhaust gas-carrying component 62 having a likewise conical structure, which exhaust gas-carrying component 62 adjoins the exhaust gas-carrying component 12 at the upstream end thereof. Thus, a mutual contact or an excessive contraction of the flow cross section is not generated even in the area of this additional exhaust gas-carrying component 62.

Figure 6:
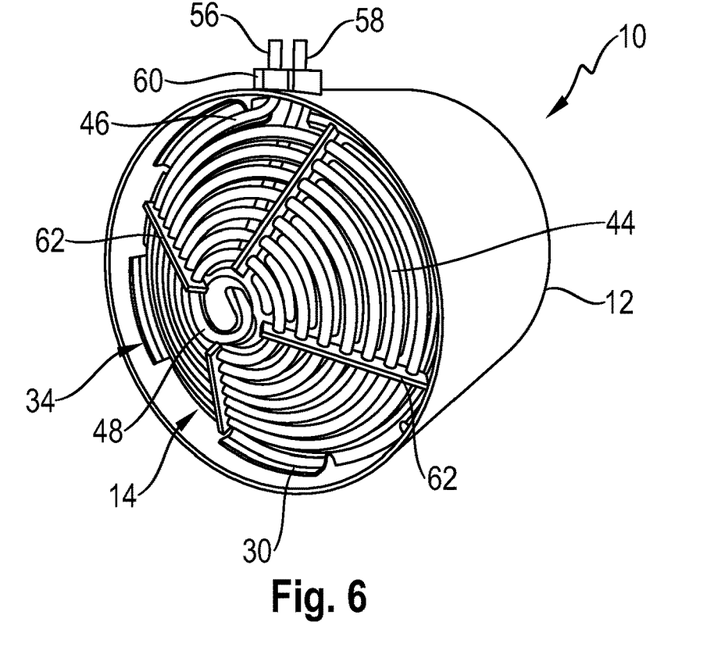
FIG. 6 is a perspective view showing a part of an exhaust system with an alternative type of embodiment of an exhaust gas heater, which view corresponds to FIG. 1.
Figure 7:
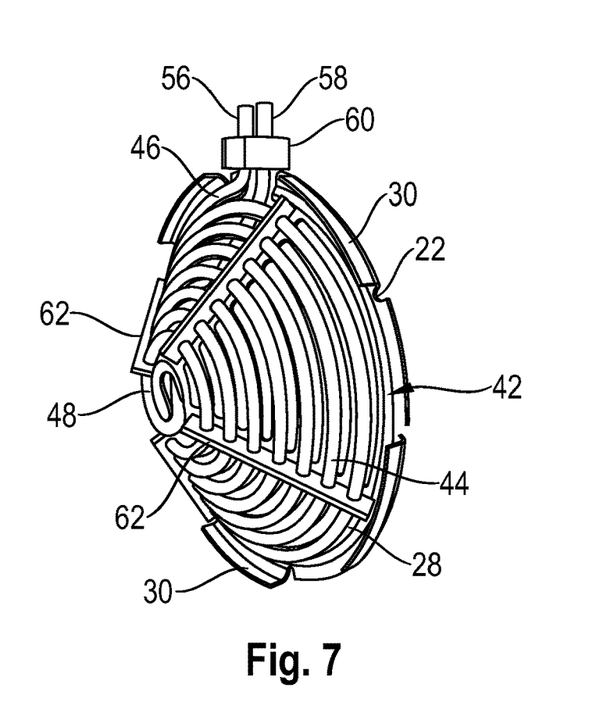
FIG. 7 is a perspective view showing the exhaust gas heater according to FIG. 6 in a perspective view.
Figure 8:
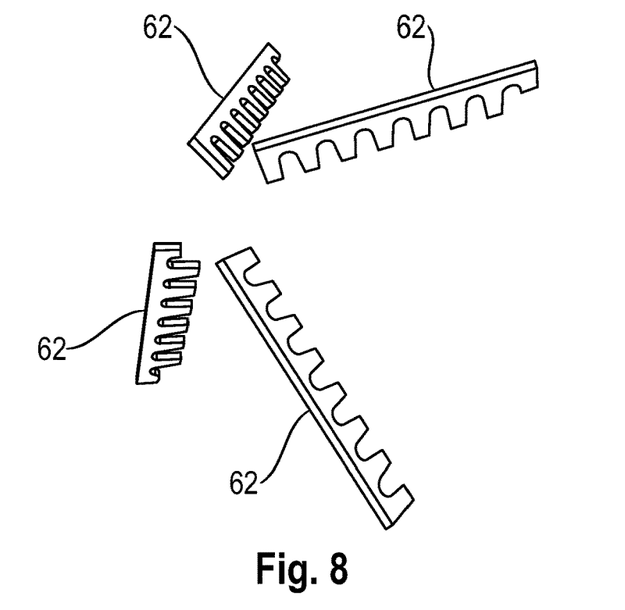
FIG. 8 is a perspective view showing the holding elements used in the exhaust gas heater according to FIG. 7.

An alternative type of embodiment of the exhaust gas heater 14 is shown in FIGS. 6 through 8. It can be clearly seen in FIGS. 6 and 7 that the support 22 of this exhaust gas heater 14 is configured in its radially outward direction such that the fastening sections 30 extend axially in the direction of the first axial side 34 of the support 22, i.e., in the upstream direction. This causes the fastening sections 30 to overlap in the axial direction with the carrying area 28 of the support 22, which leads to a shorter axial configuration and makes it possible to position the exhaust gas heater 14 closer to the catalytic converter unit 18.

FIGS. 6 through 8 also show how the heating conductor 42 can be fixed to the support 22 especially in the area of its heating section 44. A plurality of comb-shape holding elements 62 may be provided for this, and, for example, such a holding element 62 may be provided in association with each connection web 36 of the support 22.

The holding elements 62 extend over the heating section 44 of the heating conductor 42 in its sections extending in the area of the connection webs 36 and are fixed to the support 22, for example, by welding or soldering, for example, in their radially outer and radially inner end areas or/and in the areas meshing between respective turns of the heating section 44.

It should be noted that it is, of course, possible to fix the heating conductor 42 with its heating section that is in contact with the first axial side 34 of the support 22 with the use of such holding elements 62 in the embodiment shown in FIGS. 1 through 5 as well.

Figure 9:
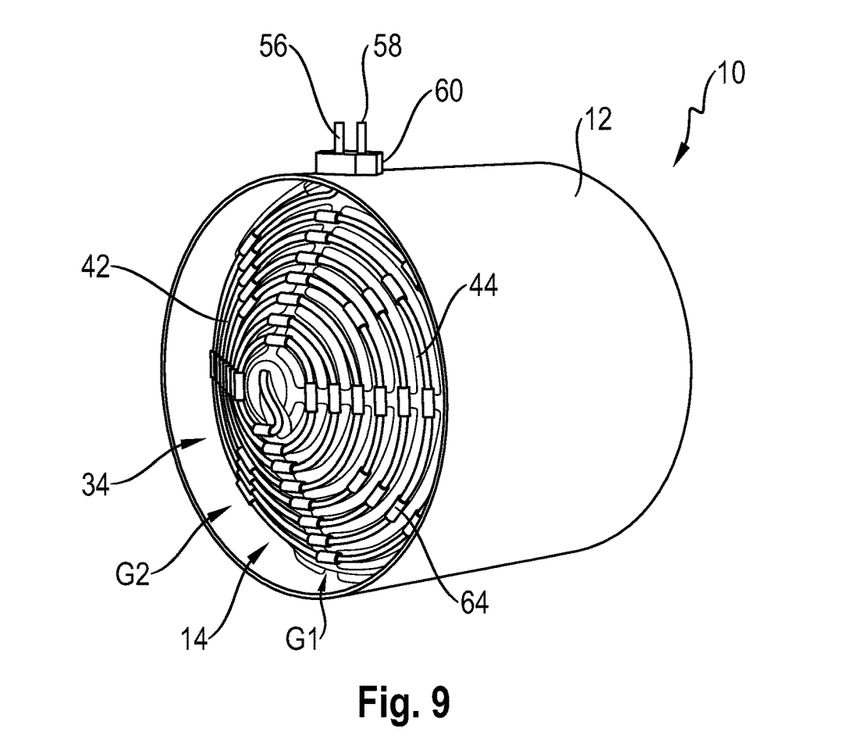
FIG. 9 is a perspective view showing another view corresponding to FIG. 1 with an alternative type of embodiment of an exhaust gas heater.
Figure 10:
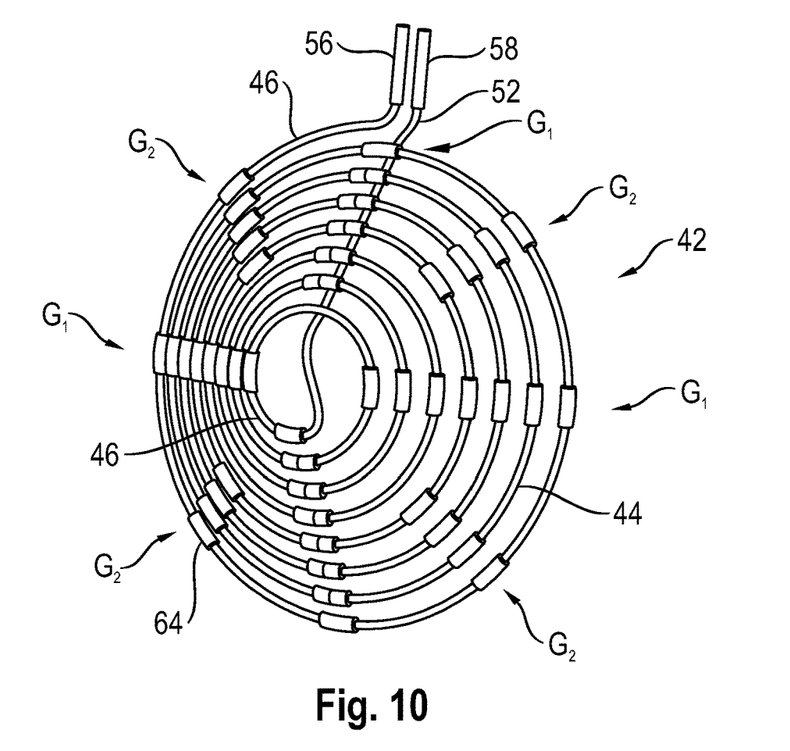
FIG. 10 is a perspective view showing a heating conductor of the exhaust gas heater according to FIG. 9.
Figure 11:
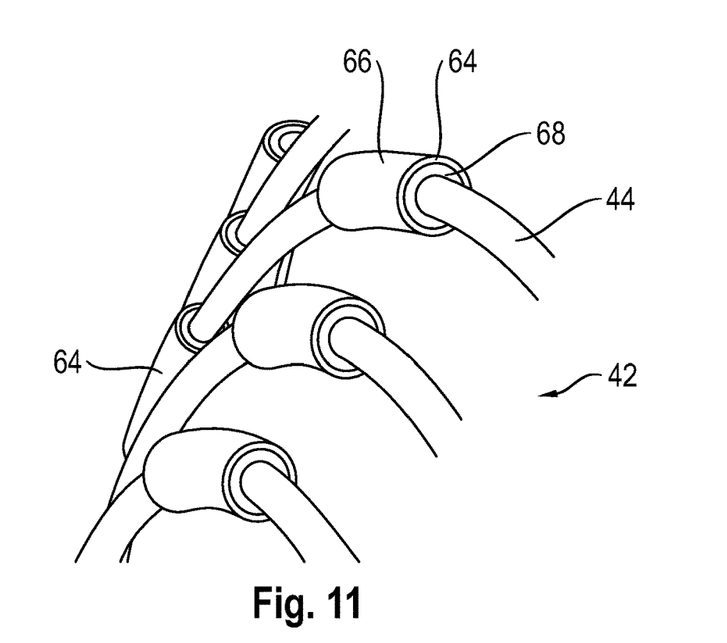
FIG. 11 is a perspective view showing an enlarged area of the heating conductor with an insulating element enclosing a heating section thereof.

Another alternative embodiment of the exhaust gas heater 14 is shown in FIGS. 9 through 11. The heating conductor 42 is not essentially insulated electrically in this embodiment in its entire length area extending between the connection sections 56, 58. This guarantees a better thermal interaction of the heating conductor 42 with the exhaust gas flowing around it. In order to make it nevertheless possible to hold the heating conductor 42 in a stable manner, for example, with the use of the holding elements 42 shown in FIG. 8, at the support 22, which may be configured as described above, first groups G1 of insulating elements 64 are arranged surrounding the heating conductor 42 in association with the connection webs 36 shown, for example, in FIG. 5. As this is shown clearly in FIGS. 10 and 11, the insulating elements 64 of the four first groups G1 are arranged in relation to one another, enclosing respective sections of the heating section 44 of the heating conductor 42, such that the first groups G1 extend from the radially outward direction to the radially inward direction along a line extending along the course of extension of the connection webs 36. A direct physical contact of the heating conductor 42 with the support 22 made of a metallic material is thus avoided. For fixing to the connection webs 36, the holding elements 62 shown in FIG. 7 may be arranged such that they extend over the insulating elements 64 of the first groups G1 of insulating elements and may be fixed to the connection webs 36 by connection in substance.

Second groups G2 of connection elements 64 are provided in the circumferential direction between two first groups G1 of connection elements 64 located directly adjacent to one another. The connection elements 64 are arranged extending linearly from the radially outward direction to the radially inward direction in the second groups G2 as well. Holding elements similar to those shown in FIG. 8 may also be used in these areas. The insulating elements 64 of the second groups G2 may, in principle, also be used only to guarantee an axial support for the heating section 44 in relation to the support 22, so that vibrations generated during the operation of an internal combustion engine, which are transmitted to the exhaust gas heater, are also unable to lead to the development of an unintended contact between the electrically not insulated heating conductor 42 and the support 22.

The insulating elements 64 of the first groups G1 and of the second groups G2 may comprise, for example, a jacket 66 configured with a metallic material, for example, stainless steel or the like, whose interior space, through which the heating conductor 42 passes, may be filled with an electrically insulting material 68, e.g., magnesium oxide, with a heat-resistant and exhaust gas-resistant plastic material or the like.

It should be noted that the exhaust gas heater described above in detail with reference to FIGS. 1 through 11 may be varied in many different aspects. For example, the support may have a different number of connection webs connecting the central area to the outer circumferential area, and the connection webs may have a, for example, curved extension different from the straight extension. The number of the flow openings formed between the connection webs may also be selected such that they are different from those shown in the Figures.

The flow openings may, in particular, also be configured such that flow openings following one another in the circumferential direction do not form opening ring structures arranged concentrically to one another, but they form a helical opening structure. Such a helical opening structure may be adapted in its course to the helical course of the heating sections, so that, for example, it is possible to predefine such a positioning of the heating section in relation to this helical opening structure that the heating section 44 essentially covers the helical opening structure, for example, when viewed in the axial direction or when viewed at right angles to an outer surface of the carrying area of the support and therefore it has hardly any direct contact with the support, so that the introduction of heat from the heating conductor into the support can be minimized. Provisions may be made in an alternative embodiment for the heating section with its helical structure to be arranged such that it does not essentially cover the helical opening structure, so that the helical opening structure offers a good possibility for the exhaust gas to flow through it, while the heating conductor with its helical heating section has now an increased thermal interaction with the support in a larger length area. A balanced structure can be selected here as well by the coverage of the flow openings or of the carrying area of the support being selected to be such that a good possibility is guaranteed for the exhaust gas flowing in the direction of the catalytic converter unit to flow through it, on the one hand, and an excessive introduction of heat into the support is also avoided, on the other hand.

Figure 12:
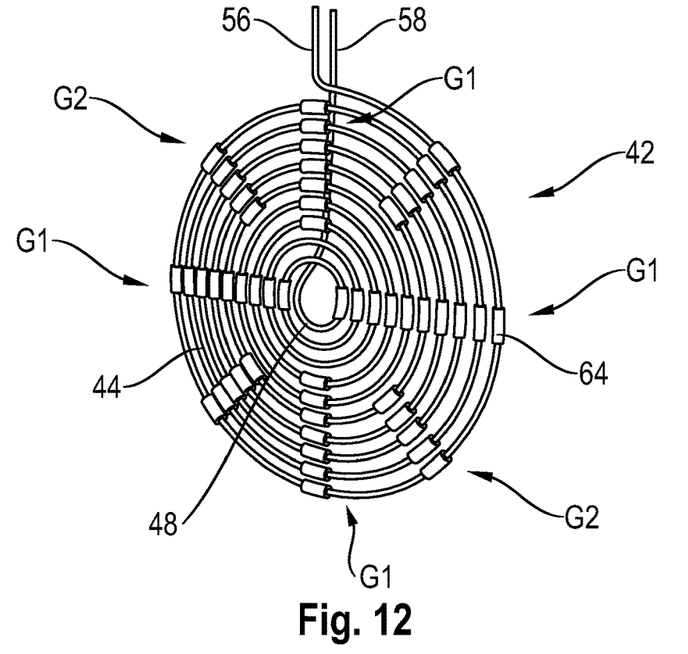
FIG. 12 is a perspective view showing an alternative type of embodiment of a heating conductor not insulated electrically in a perspective view.
Figure 13:
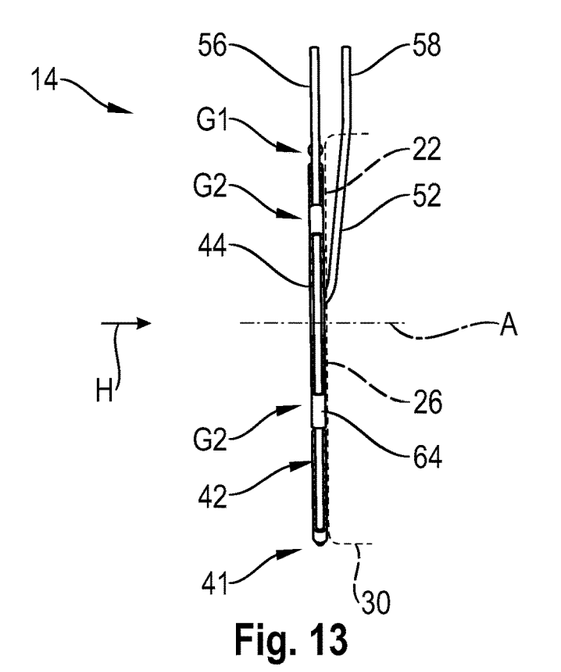
FIG. 13 is a longitudinal sectional view of the heating conductor according to FIG. 12.

An alternative embodiment of the heating conductor 42 is shown in FIGS. 12 and 13. The heating conductor 42 and the support 22 correspond here, for example, concerning the helically wound structure of the heating section 44 of the heating conductor 42 and also concerning the configuration of the central area 26 of the support 22 with the connection webs 36 and with the flow openings 38 formed between them and with the opening ring structures 40 formed with these and the alternatively formed helical opening structure to the above-described configuration, so that reference can be made to the above explanations.

However, the heating conductor 42, which is likewise not insulated electrically in the embodiment according to FIGS. 12 and 13, is not extended axially, so that the radially outer end section 46 of the heating section 44 and the radially inner end section 48 of the heating section 44 are located, for example, essentially in a plane extending at right angles to the heater longitudinal axis A and the helical structure of the heating section 44 is also located in the plane extending at right angles to the heater longitudinal axis A, regardless of the fact that the heating section 44 has, of course, an axial extension. The central area 26 of the support 22, which central area 26 likewise has an essentially flat configuration, is arranged on the side of the heating conductor 42 and of the heating section 44 thereof, which side is oriented in the downstream direction. With the insulating elements 64, which enclose the heating section 44 in some areas, and which may again be arranged, for example, in the first groups G1 and in the second groups G2, the heating conductor 42 is in contact with the central area 26, and the arrangement may again be such, for example, that the first groups G1 of insulating elements 64 can extend along a respective connection web of the support 22. For example, the comb-shape holding elements 62 shown in FIGS. 6-8, which can be fixed to the central area 26 of the support 22 meshing with their webs between radially staggered turn sections of the heating section 44, may be used to fix the heating conductor 42 at the support 22.

Based on the essentially absent electrical insulation of the heating conductor 42 in the area of its heating section 44, this embodiment also leads, with a compact axial configuration, to the advantage of a highly efficient thermal interaction of the heating conductor 42 with the exhaust gas flowing around it, and provisions are also advantageously made in this embodiment for such a good thermal interaction that the heating conductor 42 with its heating section 44 is arranged on the side of the central area 26 of the support 22, which side is oriented in the upstream direction and is not covered by areas of the support 22 nor shielded against the incoming flow of exhaust gas on its side oriented in the upstream direction.

While specific embodiments of the invention have been shown and described in detail to illustrate the application of the principles of the invention, it will be understood that the invention may be embodied otherwise without departing from such principles.

What is claimed is:

1. An exhaust gas heater for an exhaust system of an internal combustion engine, the exhaust gas heater comprising:
    a support with an outer circumferential area arranged radially on an outside in relation to a heater longitudinal axis and with a central area; and
    a heating conductor carried at the support, wherein the heating conductor comprises a helically wound heating section arranged on a first axial side of the support, wherein the central area is arranged axially offset in relation to the outer circumferential area in a direction of the first axial side of the support such that a radially outer end section of the heating section, which radially outer end section is located in an area of the outer circumferential area of the support, and a radially inner end section of the heating section, which radially inner end section is located in the area of the central area of the support, are arranged axially offset in relation to one another, wherein:
        the support comprises a plurality of connection webs, which are arranged at circumferentially spaced locations from one another and connect the central area to the outer circumferential area; and
        flow openings are formed between connection webs located directly adjacent to one another in the circumferential direction.

2. The exhaust gas heater in accordance with claim 1, wherein:
    the support has a carrying area, which extends between the outer circumferential area and the central area and carries essentially the heating section; and
    the carrying area has a conical shape.

3. The exhaust gas heater in accordance with claim 1, wherein the central area is arched convexly out in the direction of the first axial side.

4. The exhaust gas heater in accordance with claim 1, wherein the support is configured as a shaped sheet metal part.

5. The exhaust gas heater in accordance with claim 1, wherein the heating conductor is electrically insulated in a length area covering the support.

6. The exhaust gas heater in accordance with claim 1, wherein:
the heating conductor is not essentially insulated electrically in a length area covering the support; and
a plurality of insulating elements, which enclose the heating conductor and are fixed or/and supported on the heating conductor, are provided at the heating conductor.

7. The exhaust gas heater in accordance with claim 1, wherein flow openings following one another in the circumferential direction provide a plurality of opening ring structures arranged radially staggered.

8. The exhaust gas heater in accordance with claim 1, wherein flow openings following one another in the circumferential direction provide a helical opening structure.

9. The exhaust gas heater in accordance with claim 8, wherein:
a helical course of the helical opening structure corresponds essentially to a helical course of the heating section; and
the heating section is arranged in relation to the helical opening structure such that the heating section is arranged essentially covering the flow openings of the helical opening structure.

10. The exhaust gas heater in accordance with claim 8, wherein:
a helical course of the helical opening structure corresponds essentially to a helical course of the heating sections; and
the heating section is arranged in relation to the helical opening structure such that the heating section is arranged not essentially covering the helical opening structure.

11. The exhaust gas heater in accordance with claim 1, wherein:
the heating conductor comprises a connection section adjoining the radially inner end section of the heating section; and
the connection section is led at a second axial side of the support along a connection web from the radially inward direction to the radially outward direction.

12. The exhaust gas heater in accordance with claim 6, further comprising groups of insulating elements, wherein:
the support comprises a plurality of connection webs, which are arranged at circumferentially spaced locations from one another and connect the central area to the outer circumferential area; and
flow openings are formed between connection webs located directly adjacent to one another in the circumferential direction;
the groups of insulating elements are arranged extending from the radially outward direction to the radially inward direction at the heating conductor in an area of the connection webs; and
the insulating elements of the first groups of insulating elements enclose sections of the heating section, which extend in the area of the connection webs.

13. The exhaust gas heater in accordance with claim 12, wherein the groups of insulating elements comprise first groups of insulating elements and further comprising a second group of insulating elements arranged extending from the radially outward direction to the radially inward direction between at least two of the first groups of insulating elements following one another directly in the circumferential direction, wherein the insulating elements of the second group of insulating elements enclose sections of the heating section, which extend in an area between two connection webs.

14. The exhaust gas heater in accordance with claim 1, wherein the heating section is held at the support by a plurality of comb-shape holding elements, which extend over the heating section and are fixed to the support.

15. The exhaust gas heater in accordance with claim 12, wherein the heating section is held by a holding element at the support in an area of at least one and preferably each first group of insulating elements.

16. The exhaust gas heater in accordance with claim 1, wherein a plurality of fastening sections bent off in the axial direction are provided at the outer circumferential area of the support for fixing the support to an exhaust gas-carrying component.

17. The exhaust gas heater in accordance with claim 16, wherein at least some of the fastening sections are bent off in the direction of the first axial side.

18. An exhaust system comprising:
an exhaust gas-carrying component; and
an exhaust gas heater arranged in the exhaust gas-carrying component, the exhaust gas heater comprising:
a support with an outer circumferential area arranged radially on an outside in relation to a heater longitudinal axis and with a central area; and
a heating conductor carried at the support, wherein the heating conductor comprises a helically wound heating section arranged on a first axial side of the support, wherein the central area is arranged axially offset in relation to the outer circumferential area in a direction of the first axial side of the support such that a radially outer end section of the heating section, which radially outer end section is located in an area of the outer circumferential area of the support, and a radially inner end section of the heating section, which radially inner end section is located in the area of the central area of the support, are arranged axially offset in relation to one another, wherein:
the support comprises a plurality of connection webs, which are arranged at circumferentially spaced locations from one another and connect the central area to the outer circumferential area; and
flow openings are formed between connection webs located directly adjacent to one another in the circumferential direction.

19. The exhaust system in accordance with claim 18, wherein the exhaust gas heater is arranged in the exhaust gas-carrying component with the heater longitudinal axis extending essentially in a direction of an exhaust gas main flow direction such that the support is oriented with the first axial side in the upstream direction such that the radially inner end section of the heating section, which radially inner end section is located in the area of the central area of the support, is positioned upstream in relation to the radially outer end section of the heating section, which radially outer end section is located in the area of the outer circumferential area of the support, or/and the heating section is not covered on its side oriented upstream by the support.

20. The exhaust system in accordance with claim 18, wherein the exhaust gas heater is arranged upstream in relation to an exhaust gas treatment unit arranged in the exhaust gas-carrying component.

21. An exhaust gas heater for an exhaust system of an internal combustion engine, the exhaust gas heater comprising:
- a support with an outer circumferential area arranged radially on an outside in relation to a heater longitudinal axis and with a central area; and
- a heating conductor carried at the support, wherein the heating conductor comprises a helically wound heating section arranged on a first axial side of the support, wherein:
    - the heating conductor is not essentially insulated electrically in a length area covering the support; and
    - a plurality of insulating elements, which enclose the heating conductor and are fixed or/and supported on the heating conductor, are provided at the heating conductor.

22. The exhaust gas heater in accordance with claim 21, wherein the central area is arranged axially offset in relation to the outer circumferential area in a direction of the first axial side of the support such that a radially outer end section of the heating section, which radially outer end section is located in an area of the outer circumferential area of the support, and a radially inner end section of the heating section, which radially inner end section is located in the area of the central area of the support, are arranged axially offset in relation to one another.

* * * * *